United States Patent [19]

Sadler et al.

[11] 4,006,920
[45] Feb. 8, 1977

[54] JOINT ASSEMBLY FOR INSULATING HIGH TEMPERATURE FLUID CARRYING CONDUITS

[75] Inventors: Thomas Harry Sadler, Morrison; Ronald Neal Cerny, Littleton, both of Colo.

[73] Assignee: Johns-Manville Corporation, Denver, Colo.

[22] Filed: Mar. 12, 1975

[21] Appl. No.: 557,704

[52] U.S. Cl. ............................ 285/14; 285/47; 285/111; 285/138; 285/351
[51] Int. Cl.² .............................. F16L 11/12
[58] Field of Search ............ 285/13, 14, 47, 111, 285/133 R, 138, 351

[56] References Cited

UNITED STATES PATENTS

| | | | |
|---|---|---|---|
| 3,492,029 | 1/1970 | French et al. | 285/47 |
| 3,563,572 | 2/1971 | French | 138/149 |
| 3,575,445 | 4/1971 | French | 285/47 |

Primary Examiner—Andrew V. Kundrat
Attorney, Agent, or Firm—Robert M. Krone; Joseph J. Kelly; Stephen C. Shear

[57] ABSTRACT

A joint assembly connected with one end of a heat insulated conduit which includes an outer casing, a concentric inner core and an intermediate concentric layer of insulation material is disclosed herein. This assembly defines a passage extending from the conduit core outwardly to the outer surface of the joint assembly. This passage is provided such that fluid therein and under a predetermined amount of pressure in the direction towards the outer surface of the assembly will move out of the passage in the direction of pressure, i.e., to the outer surface of the joint assembly rather than into the layer of insulation material comprising part of the conduit.

13 Claims, 5 Drawing Figures

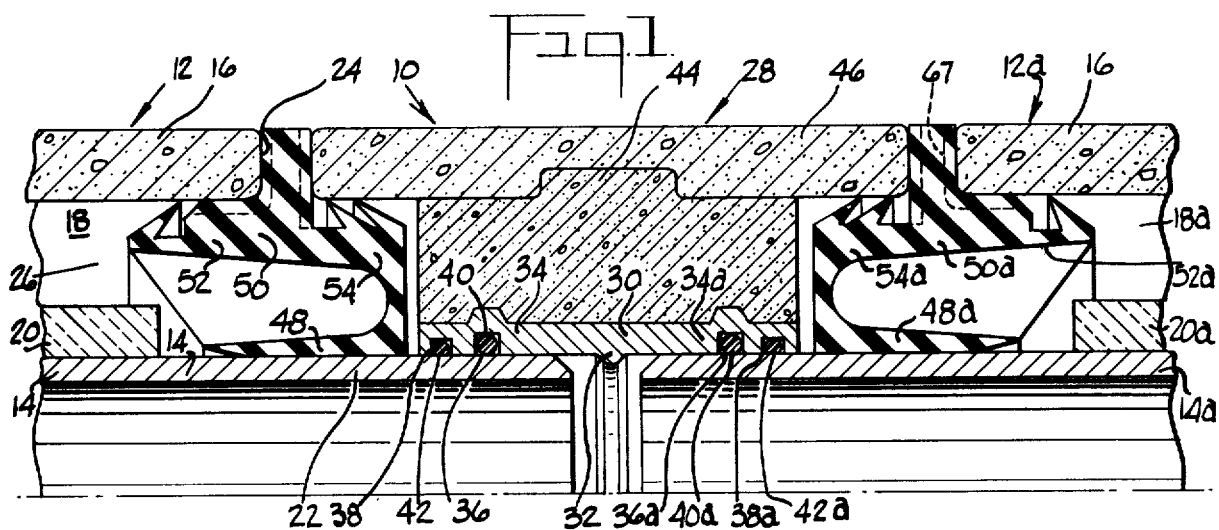
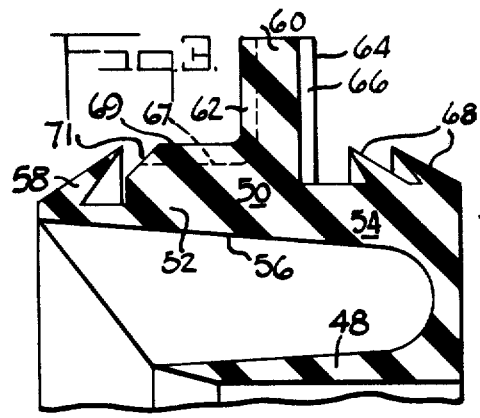
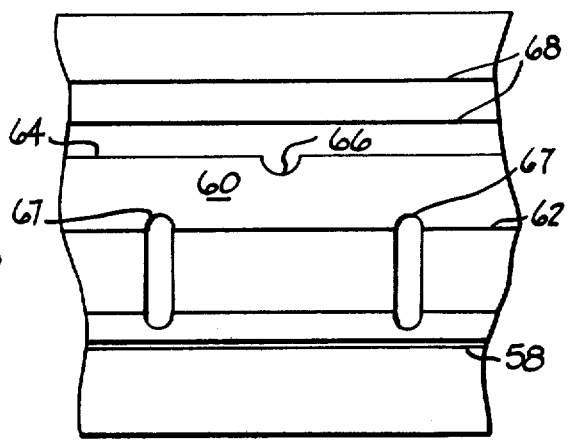
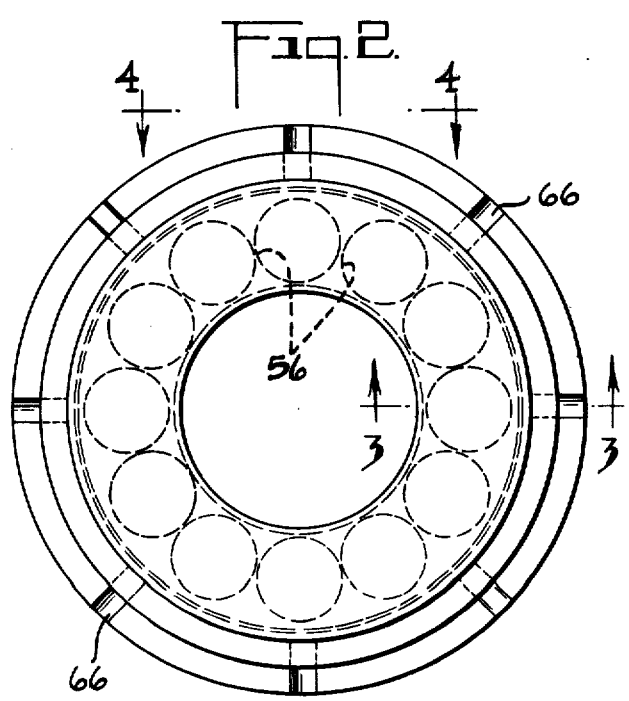
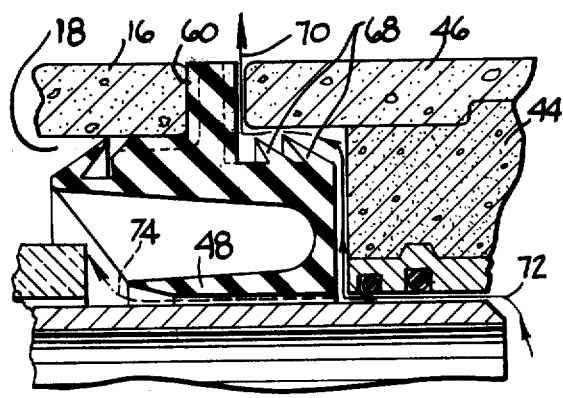

JOINT ASSEMBLY FOR INSULATING HIGH TEMPERATURE FLUID CARRYING CONDUITS

BACKGROUND OF THE INVENTION

The present invention relates generally to a joint assembly for connecting together sections of heat insulated high temperature fluid carrying conduits and more particularly to an improvement in an assembly of this type.

Where conduit service for carrying high temperature fluids, for example extremely hot water or steam, is required, it is often desirable and sometimes necessary to use a heat insulated conduit for this service. A quite satisfactory conduit of this type is disclosed in U.S. Pat. No. 3,563,572 issued to D. W. French on Feb. 16, 1971 and assigned to Johns-Manville Corporation, assignee of the present application.

The fluid carrying insulated conduit disclosed in the French patent is essentially composed of concentric lengths of pipe consisting of an inner fluid carrying pipe or core, an outer protective pipe or casing spaced concentrically around the inner pipe core and a layer of thermal insulating material positioned concentrically therebetween. Two conduits sections of this type are connected together by means of a composite coupling arrangement including an innermost tubular sealing sleeve or coupling which is positioned concentrically around adjacent end sections of the inner fluid carrying pipes or cores of adjacent conduit sections. In this regard, the cores project out beyond their associated concentrically disposed insulation layers and outer casings. Fluid seals are provided between the innermost coupling and the projecting core sections by means of a pair of stainless steel spring loaded gasket rings of trifluorinated ethylene (E. I. DuPont's "TEFLON" or Allied Chemical's "HALON").

As set forth in the French disclosure, these trifluorinated ethylene sealing rings may require heat deformation to effectively seat and seal them for complete sealing between the innermost coupling and projecting core sections. As further stated, this may be automatically provided when the sealing rings are exposed to the temperatures of the hot fluid carried in a conduit. However, this patent does recognize that minor leaks are possible until the sealing rings have been adequately exposed to the elevated temperatures of the carried fluid. Thus, to prevent possible initial leakage, the French patent suggests the inclusion of a pair of secondary sealing rings. In accordance with the French patent, since these secondary seals may only be required until the unit has been exposed to high temperatures for seating the primary seals, i.e., the trifluorinated ethylene seals, the secondary seals may be composed of a composition designed only to endure relatively low temperatures such as ethylene propylene rubber which will perform continuously at temperatures up to or slightly above about 250° F. When continuously exposed to these temperatures, the secondary seals will eventually become permanently damaged. However, the trifluorinated ethylene compound will have had sufficient exposure to the heat to effect proper seating.

It has been found not only to be desirable but important to the overall performance of the arrangement disclosed in the French patent to prevent the occurrence of this initial leakage just discussed since it is possible for the moisture leaking past the seals to enter into the insulation layers comprising part of the connected conduits. Moisture reaching the insulation layers could adversely affect the performance of the overall conduit arrangement. Accordingly, as stated, the French patent discloses the utilization of secondary sealing rings. To prevent the leakage in the event the secondary sealing rings are not used, it has been found necessary to either preheat the trifluorinated ethylene rings, i.e., the primary seals, before subjecting the conduits to high temperature fluid under pressure, for example the hot water or steam, or by gradually rising the temperature of the fluid within the conduits, under low pressure conditions, so as to sufficiently heat up the primary seals before the fluid is raised to the higher operational pressures. This preheating procedure is strongly advisable in subsequent startups even if the secondary seals are used. More specifically, the secondary seals may be initially used but probably will become damaged and ineffective as a result of being subjected to the high temperatures within the conduits. Accordingly, when the conduits are subsequentially cooled (through lack of service) and thereafter are required to carry the hot fluid a second time, i.e., during a second start-up, it is strongly advisable that the aforediscussed preheating procedure be followed to prevent the aforediscussed initial leakage.

As will be seen hereinafter, the present invention is directed to an improvement in the overall arrangement disclosed in the French patent. This improvement substantially minimizes or eliminates the possibility of moisture reaching the aforediscussed layer of insulation material comprising part of the heat insulated conduit in the event there is the initial leakage discussed above and, in fact, makes it possible to eliminate the secondary seals and/or preheating procedure otherwise used to prevent the initial leakage.

BRIEF SUMMARY OF THE INVENTION

An object of the present invention is to provide an overall conduit arrangement for carrying high temperature fluids under pressure which arrangement is an improvement over the arrangement disclosed in the aforediscussed French Pat. No. 3,563,572.

A more specific object of the present invention is to provide a joint assembly connected with one end of a heat insulated conduit of the type disclosed in the French patent, which assembly minimizes if not substantially eliminating the possibility of moisture entering into the insulation layer of the conduit in the event there is initial leakage of the type discussed with respect to the French patent.

Another object of the present invention is to provide a joint assembly of the last mentioned type wherein because of the minimization or substantial elimination of moisture reaching the insulation layer of the conduit as a result of initial leakage, it might not be absolutely necessary to provide secondary seals of the type disclosed in the French patent or to provide the initial preheating start-up procedure discussed previously when secondary seals are not used or if they become damaged and ineffective.

The joint assembly constructed in accordance with the present invention is connected with one end of a heat insulated conduit which, like the conduit disclosed in the French patent, includes an outer casing, a concentric inner core and a concentric layer of insulation material therebetween. The core includes a circumferential end section which extends beyond adjacent ends of the casing and layer of insulation material. The assembly is comprised of a coupling arrangement and a circumferential end seal. The coupling arrangement includes a first longitudinal portion which is located concentrically around a first portion of the core end section, spaced from the adjacent ends of the casing and insulation material, and a second portion which is adapted to connect the end of the conduit to an adjacent end of a second conduit. The circumferential end seal is located concentrically around and against a second portion of the core end section between the adjacent ends of the casing and insulation layer and the coupling. One circumferential side of the end seal engages against these adjacent ends and its opposite circumferential side faces the coupling.

In accordance with the present invention, the coupling arrangement and end seal together define a passage extending therebetween from the core of the conduit, actually the outer surface of the core, outwardly to the outer surface of the coupling arrangement, i.e., to the ambient surroundings. This passage is provided such that fluid within the passage and under minimum pressure, for example about 1–5 psi in the direction towards the outer surface of the coupling arrangement, i.e., towards the ambient surroundings, will move out of the passage in the direction of the pressure rather than passing into the insulation layer of the conduit. Accordingly, should there be an initial fluid leak of the type discussed previously, the fluid resulting from this leak will pass into the provided passage and out into the ambient surroundings before it has had a chance to pass into the insulation layer of the conduit. This minimizes or eliminates the necessity to use a secondary seal and minimizes or eliminates the necessity to use an initial stringent start-up procedure of the type discussed previously.

BRIEF DESCRIPTION OF THE DRAWINGS

FIG. 1 is a diametral cross-sectional view of an overall conduit arrangement constructed in accordance with the present invention.

FIG. 2 is a side elevational view of an annular end seal which comprises part of the arrangement of FIG. 1 and which is constructed in accordance with the present invention.

FIG. 3 is a sectional view of the end seal of FIG. 2, taken generally along line 3—3 in FIG. 2.

FIG. 4 is a sectional view of the end seal of FIG. 2, taken generally along line 4—4 in FIG. 2.

FIG. 5 is an exploded diametral sectional view of a portion of the arrangement of FIG. 1, illustrating a specific function of the arrangement.

DETAILED DESCRIPTION AND PREFERRED EMBODIMENTS

Turning to the drawing, wherein like components are designated by like reference numerals throughout the various figures, attention is directed specifically to FIG. 1 which illustrates a joint assembly constructed in accordance with the present invention. As will be seen hereinafter, this joint assembly, generally designated by the reference numeral 10, is provided for connecting together the adjacent ends of two heat insulated conduits 12 and 12a which are adapted to carry high temperature fluids under pressure. Examples of such fluids are steam reaching temperatures of approximately 450° F and under associated pressures or hot water reaching temperatures of approximately 450° F and pressures in excess of in approximately 500.0 psi.

Conduit 12 includes an innermost fluid carrying pipe or core 14 which may be constructed of, for example, carbon steel and an outermost protective pipe or tubular casing 16 which may be constructed of, for example, asbestos-cement. The core and outer casing are spaced from one another as illustrated in FIG. 1 and a concentric tubular layer of insulation, for example, polyurethane foam, is located therebetween. An additional tubular layer of insulation 20, for example, high temperature lime silicate, may also be provided between core 14 and outer casing 16, for example directly against the outer surface of the core, as seen in FIG. 1. As also seen in this figure, core 14 includes a tubular end section 22 which extends beyond the adjacent ends 24 and 26 of outer casing 16 and insulation layer 18, respectively. This protruding end section is preferably corrosion resistant due to the material making up the core or is made to be corrosion resistant by suitable treatment.

Conduit 12a is preferably identical to conduit 12. Hence, like components of the two conduits are designated by a like reference numeral with the suffix letter a designating those components making up the conduit 12a from those making up conduit 12.

As stated previously, joint assembly 10 is provided for connecting together conduits 12 and 12a. To this end, assembly 10 includes a composite coupling arrangement 28 which, in turn, includes an innermost tubular coupling 30 which is preferably constructed of centrifugally cast bronze but which may be constructed of stainless steel or relatively corrosion resistant metal or dense and durable plastic. The coupling has an inner diameter just slightly greater than the outer diameters of cores 14 and 14a of conduits 12 and 12a, thereby enabling the end sections 22 and 22a of the cores to be readily slipped into the ends of the coupling in a telescoping fashion. In this regard, the coupling includes an annular shoulder 32 which extends radially inwardly from its inner surface and which is located equidistant from the ends of the coupling. Shoulder 32 which is provided as a thrust safety shoulder against which the adjacent free ends of core end sections 22 and 22a may abut and separates the coupling into two coupling sections 34 and 34a. Section 34 is located concentrically around an end portion of core end section 22 and section 34a is positioned concentrically around an end portion of core end section 22a.

Each of the coupling sections 34 and 34a includes a respective inner circumferential groove 36 and 36a and may include a second adjacent inner circumferential groove 38 and 38a. Annular sealing rings or gaskets 40 and 40a are respectively disposed within grooves 36 and 36a, actually partially within the grooves and partially extending out of the grooves so as to engage against the outer surfaces of core end sections 22 and 22a, thereby providing fluid seals therebetween. In an actual working embodiment, each of these sealing rings is composed of a stainless steel spring loaded gasket ring of trifluorinated ethylene, i.e., identical to those disclosed in the French patent discussed previously. Accordingly, these sealing rings may require heat deformation which, as stated, can be provided by exposure to the temperatures of the hot fluid carried in the conduits, for example temperatures at and in excess of 200° F, to effectively seal them for complete sealing. A second pair of sealing rings may also be provided, specifically sealing rings 42 and 42a, which are located within the secondary grooves 38 and 38a. These secondary sealing rings may be identical to those used in the French patent. More specifically, these secondary sealing rings may be made of a composition designed only to endure relatively low temperatures such as ethylene propylene rubber which will perform continuously at temperatures up to in excess of about 250° F. However, for reasons to become apparent hereinafter, it is not necessary for the performance of the product that these secondary sealing rings 42 and 42a be provided. However, their elimination is not recommended, because of installation testing procedures. For example, the pipe line may come to a change in direction requiring a thrust block. After installation of the thrust block and before continuing to lay further pipe, pressure testing (air or water) is generally practiced, to verify the adequacy of the thrust block. The secondary seal is needed for this testing procedure and is important because usually such tests use much greater pressure than operating line pressure as a standard safety procedure.

As illustrated in FIG. 1, composite coupling arrangement 28 also includes a lock block 44 which is composed of any substantially rigid or non-compressible thermal insulating material capable of enduring the temperature of contemplated service. Such material should have adequate strength properties to integrally bond the outer asbestos cement case to the internal coupling without temperature degredation of its strength properties. The lock block is located concentrically around and against the outer circumferential surface of coupling 30 and may have its longitudinal ends located in alignment with the longitudinal ends of coupling 30. An outer coupling casing or shell 46 is disposed concentrically around lock block 44 and also comprises part of the overall coupling arrangement. Shell 46 which may be constructed of, for example, asbestos-cement or other suitable rigid material, extends longitudinally beyond the opposite longitudinal ends or sides of both the lock block and coupling.

As stated, composite coupling arrangement 28 comprises part of the overall joint assembly 10. This assembly also includes two annular end seals 48 and 48a. As will be seen, each of these end seals is located between an end of the composite coupling arrangement and in an adjacent end of an adjacent conduit. End seals 48 and 48a may be composed of any appropriate elastomer type material which exhibits sufficient elastic response of properties to provide an effective seal and which will endure the contemplated conditions such as temperature and soil contact of the designed service. Such materials may, for example, be appropriate synthetic rubbers.

Turning to FIGS. 2, 3 and 4, attention is specifically directed to end seal 48. As seen best in FIG. 3, end seal 48 includes a main body 50 and opposite side sections 52 and 54. For reasons to be discussed hereinafter, end seal 48 includes a plurality of openings 56 extending into end seal body 50 from side section 52, the openings being circumferentially spaced from one another as best seen in dotted line fashion in FIG. 2. For reasons also to be discussed hereinafter, side section 52 includes an annular fin 58 extending outwardly and towards side section 54.

In addition to the foregoing, end seal 48 includes an annular flange 60 which extends radially outwardly from main body 50 approximately centrally between the end sections 52 and 54 of the main body. As best seen in FIGS. 1 and 3, this flange includes opposite circumferential sides 62 and 64. For reasons to be discussed hereinafter, circumferential side 64, i.e., the side facing in the direction of end section 54 of the seal includes a plurality of slots or ports 66 (see FIGS. 2 and 4) which extend radially outwardly the length of side 64 and which are circumferentially spaced from one another along the circumference of side 64.

For reasons also to be discussed hereinafter, circumferential side 62, circumferential surfae 69 and a portion of surface 71 (see FIGS. 2 and 4) may include a plurality of slots 67 circumferentially spaced along these surfaces.

Side section 54 of the end seal 48, which side section projects longitudinally beyond the circumferential side 64 of flange 60, includes at least one but preferably a plurality of annular fins 68 which are longitudinally spaced from one another. Each of these fins is located in front of flange 60 and extends outwardly and at an angle back towards side 64 of the flange, as best seen in FIGS. 1 and 3, each fin tapering to a point. For reasons to be discussed hereinafter, the design of each of these fins is such that it is readily flexible in the direction towards flange 60 but not nearly as flexible in the opposite direction.

End seal 48a may be substantially identical to end seal 48. Hence, like components of the two end seals are designated by the same reference numerals, the suffix letter a distinguishing those components of end seal 48a from those of end seal 48.

Returning specifically to FIG. 1, attention is directed to the specific positioning of end seal 48 with respect to composite coupling arrangement 10 and heat insulated conduit 12. As seen in FIG. 1, this end seal is disposed concentrically around and directly against a second portion of core end section 22 between the coupling arrangement and the adjacent ends 24 and 26 of outer casing 16 and insulation layer 18, respectively. As illustrated, the side section 52 of the end seal faces ends 24 and 26. In fact, circumferential side surface 62 of flange 60 is in direct abutting engagement with the end 24 of outer casing 16 with surface 69 resting against the underside of the outer casing. In this regard, where slots 67 are used, they provide passages between the casing and end seal for moisture to escape from insulation layer 18, as will be seen. In addition, the insulation material making up layer 18 may extend into the previously described openings 56. This is of course done during initial construction of the insulation layer when the insulation material making up this layer is in a more liquid state, i.e., uncured. The fin 58 engages against one underside of outer casing 16 and is tapered outwardly and towards flange 60. This fin prevents fluid under no pressure from entering into insulation layer 18 through slots 67 (if these slots are used) but flexes out of engagement with casing 16 in response to fluid under pressure within the insulation layer (if fluid gets in this layer). Hence such fluid under pressure has a path of escape, i.e., past fin 58 and out slots 67.

The opposite end section 54 of the end seal, as stated, faces composite coupling arrangement 10. More specifically, as seen in FIG. 1, one end of outer shell 46 is in abutting engagement with an outer portion of circumferential side 64 of flange 60. Note however, that the ports or slots 66 provide passageways between these engaging surfaces. With the end seal in this position, the previously described fins 68 engage along their entire circumferential free ends, i.e., their tapered ends, against the inner surface of shell 46 directly in front of flange 60, this being the only engagement between the end seal and inner surface of shell 46. In addition, it should be noted that the end seal is spaced from coupling 30 and lock block 44.

With end seal 48 positioned in the manner just described, this end seal and coupling arrangement 28 together define an overall passage indicated by the arrow 70 in FIG. 5. This overall passage extends between the coupling arrangement and the end seal (due to the spacing therebetween) outwardly from the outer surface of core 14 of conduit 12 to the inner surface of shell 46, then longitudinally past fins 68 and finally radially outwardly through ports or slots 66 towards the outer surface of outer shell 46, i.e., to the ambient surroundings. The passage is designed so that any fluid therein and under minimum pressure, for example about 1–5 psi or higher, in the direction of arrow 70, i.e., in the direction towards the outer end of the passage will move out of the passage including through at least one of the ports or slots. In this regard, the fins 68 are located within and across the overall passage 70 and, as stated, engage against the inner surface of shell 46 to prevent liquid which is under substantially no pressure and which is located outwardly of the fins, i.e., liquid originating from the ambient surroundings of the overall joint, from passing inwardly beyond the fins. In addition, the fins, due to their tapering configurations and the material from which they are made, are sufficiently resilient to flex out of engagement with the outer shell against the force of the fluid under pressure within the passage inwardly of the fin, whereby to allow the inwardly located fluid under pressure to pass outwardly beyond the fins.

Having described the overall structure making up joint assembly 10 and particularly the way in which this assembly defines passageway 70, attention is now directed to the manner in which this assembly and particularly the passageway functions in accordance with the present invention. Let it be assumed that the previously described primary seal 40 and previously described secondary seal at least momentarily do not provide an effective fluid seal between coupling section 34 and core end section 22. This could for example occur if the trifluorinated ethylene seal (if this type of seal is used) is not sufficiently heat deformed to provide an adequate seal before the conduits are subjected to pressurized fluid, for example hot water or steam, and the secondary seal 42 is damaged due to previous use. In this case, fluid from within the conduits will leak pass the seals as indicated by arrow 72 in FIG. 5 and enter into passage 70. If no passage 70 existed, the moisture passing the seals would tend to seek the path of least resistance which, heretofore, has been or could possibly have been the path designated by the dotted arrow 74. As noted in FIG. 5, this path 74 leads into the insulation layer 18 of conduit 12 possibly causing the moisture resulting from the leak to attack the insulation. By providing passage 70, the moisture entering this passage, again seeking the path of least resistance, passes up through the passage which provides such a path and out of the joint rather than into the insulation layer. Accordingly, it is not nearly as critical to prevent such leakage with the provision of passage 70. In fact, the momentary leakage past seal 40 during the time in which it takes the seal to heat deform during the initial introduction of high temperature fluids under pressure within the conduits can be tolerated to a greater extent than the French Patent.

The passage 70 has been defined as being between end seal 48 and coupling arrangement 28. This appears to be the most economical, uncomplicated and reliable way to direct the passage to accomplish the function it is to provide. While probably not as desirable, this passage could extend through at least a part of the end seal, at least a part of the coupling arrangement or, for that matter through at least a part of conduit 12. However, the passage must (1) be moisture insulated from insulation layer 18 and (2) it must perform the same function as that of passage 70, i.e., to direct any fluid under pressure and leaking past the seals 40 and 42 to ambient surroundings without entering into layer 18.

It is to be understood that seal 48*a* is positioned between coupling arrangement 28 and conduit 12*a* in the same way as that of seal 48 with respect to the coupling arrangement and conduits 12. Hence, a passage similar to passage 70 is provided between composite coupling arrangement 28 and end seal 48*a*. In this way, the insulation layer 18*a* of conduit 12*a* is protected against moisture attack in a similar way as that of insulation layer 18.

What we claim is:

1. A joint assembly connected with one end of heat insulated conduit which includes an outer casing, a concentric inner core and a concentric layer of insulation material therebetween, said core including a circumferential end section extending longitudinally beyond adjacent ends of said casing and layer of insulation material, said assembly comprising:
   a. a coupling arrangement at least including a coupling having a first longitudinal portion which is located concentrically around a first portion of said core end section and which is spaced from the adjacent ends of said casing and insulation material and a second portion which is adapted to connect said one end of said conduit to an adjacent end of a second conduit;
   b. a circumferential end seal located concentrically around and against a second portion of said core end section between said adjacent ends and said coupling, one circumferential side of said end seal engaging against the adjacent ends of casing and insulation material and its opposite circumferential side facing said coupling; and
   c. said coupling and end seal together defining a passage, said passage extending therebetween from said core outwardly to the outer surface of said coupling arrangement and ambient surroundings of said joint assembly, said passage being such that fluid therein and under a predetermined amount of pressure in the direction towards the outer surface of said coupling arrangement will move out of said passage in the direction of said pressure to the ambient surroundings, said end seal preventing said fluid from passing into said layer of insulation material.

2. An assembly according to claim 1 including means located within and across said passage for
   i. preventing liquid which is under substantially no pressure and which is located outwardly of said means from passing inwardly beyond said means, and
   ii. allowing liquid which is under said pressure and which is located in said passage inwardly of said means to pass beyond said means towards the outer surface of said coupling arrangement.

3. An assembly according to claim 2 wherein said means includes a circumferential fin comprising part of said end seal, said fin extending into and across said passage and engaging against said coupling arrangement, said fin being sufficiently resilient to flex out of engagement with said coupling against the force of said liquid under pressure located inwardly of said fin.

4. An assembly according to claim 1 wherein a circumferential portion of said opposite side of said end seal engages directly against a circumferential portion of said coupling arrangement, one of said circumferential portions of said opposite side and of said coupling arrangement including at least one transverse slot extending across said one circumferential portion and comprising part of said passage.

5. An assembly according to claim 4 wherein said slot is located within and transversely across said circumferential portion of said end seal.

6. An assembly according to claim 5 wherein said end seal includes a plurality of said transverse slots circumferentially spaced from one another along said circumferential portion of said end seal.

7. An assembly according to claim 1 wherein said first longitudinal portion of said coupling includes a concentric, inner circumferential groove located around its inner circumference and wherein said coupling arrangement includes a circumferential sealing gasket, a circumferential portion of which is located within said groove and a circumferential portion of which is located outside said groove and around the outer surface of said core end section, said gasket being constructed to deform inwardly in response to the application of a specific amount of heat to said gasket, said gasket, upon deforming, seal engaging against the outer surface of said end section of said core.

8. An assembly according to claim 1 wherein said predetermined amount of pressure is approximately at least 1-5 psi.

9. A joint assembly connected with one end of a heat insulated conduit which includes a tubular outer casing, a concentric tubular inner core and a concentric tubular layer of insulation material therebetween, said core including a tubular end section extending longitudinally beyond adjacent ends of said casing and layer of insulation material, said assembly comprising:
 a. a composite tubular coupling arrangement including a first longitudinal portion which is located concentrically around a first portion of said core end section and which is spaced from said adjacent ends of said casing and insulation material and a second portion which is adapted to connect said one end of said conduit to an adjacent end of a second conduit, said coupling arrangement including means providing a fluid seal between said first longitudinal portion of said coupling arrangement and said end section of said core when said sealing means is heated to a specific temperature;
 b. an annular end seal located concentrically against a second portion of said core end section between said adjacent ends and said coupling arrangement, said end seal including
  i. one annular side in engagement with said adjacent ends of said casing and insulation material, and
  ii. an opposite annular side facing said coupling, said opposite side including an annular fin engaging against said coupling arrangment along the entire circumference of said fin;
 c. said coupling arrangement and end seal together defining a passage extending therebetween outwardly from said core to the outer surface of said coupling arrangement, said passage being such that any liquid therein and under at least about 1-5 psi pressure in the direction towards the outer surface of said coupling arrangement will move out of said passage in the direction of said pressure; and
 d. said fin being located within and across said passage to prevent liquid which is under substantially no pressure and which is located outwardly of said fin from passing inwardly beyond said fin, said fin being sufficiently resilient to flex out of engagement with said coupling against the force of said liquid under pressure within said passage inwardly of said fin whereby to allow said liquid under pressure to pass outwardly beyond said fin.

10. A joint assembly connected with one end of a heat insulated pipe which includes a tubular outer casing, a concentric tubular inner core and a concentric tubular layer of insulation material therebetween, said assembly comprising:
 a. a composite tubular coupling arrangement including
  i. an innermost tubular coupling including a first longitudinal portion which is located concentrically around a first portion of said core end section and which is spaced from said adjacent ends of said casing and insulation material and a second portion which is adapted to connect said one end of said pipe to an adjacent end of a second pipe, said coupling including means providing a liquid seal between said first longitudinal portion of said coupling and said core end section when said sealing means is heated to a specific temperature,
  ii. a tubular lock block located concentrically around said coupling and spaced from said adjacent ends of said casing and insulation material, and
  iii. a tubular outer shell located concentrically around said lock block and spaced from said adjacent ends;
 b. an annular end seal located concentrically around and against a second portion of said core end section between said adjacent ends and said coupling, said end seal including
  i. one side in engagement with said adjacent ends of said casing and insulation material, and
  ii. an opposite side facing said coupling;
 c. said opposite side of said end seal including
  i. a circumferential surface portion thereof engaging against said outer shell of said coupling arrangement,
  ii. a plurality of circumferentially spaced slots extending across said circumerential surface portion to provide passageways between said surface portion and said outer shell, and
  iii. a circumferential fin engaging along its entire circumference against said outer shell;
 d. said coupling arrangement and end seal together defining an overall passage which includes said slots and which extends between said arrangement and end seal outwardly from said core to the outer surface of said shell, said passage being such that any liquid therein and under at least about 1-5 psi pressure in the direction towards the outer surface of said outer shell will move out of said passage including through at least one of said slots in the direction of said pressure and e. said fin being located within and across said overall passage to prevent liquid which is under substantially no pressure and which is located outwardly of said fin from passing inwardly beyond said fin, said fin being sufficiently resilient to flex out of engagement with said outer shell against the force of said liquid under pressure within said passage inwardly of said fin whereby to allow said inwardly located liquid under pressure to pass outwardly beyond said fin.

11. A conduit arrangement, comprising:

a. a conduit including an outer casing, a concentric inner core and a concentric layer of insulation material therebetween, said core including a circumferential end section extending longitudinally beyond adjacent ends of said casing and layer of insulation material;

b. a joint assembly adapted to connect said conduit to another conduit, said assembly including
   i. a coupling arrangement at least including a coupling having a longitudinal portion which has an end that is located concentrically around a portion of said core end section spaced from the ends of said casing and insulation material, and
   ii. fluid seal means between said coupling portion and said portion of said core end section; and c. said conduit arrangement defining a passage extending along the outer surface of said core end section from the free end of said end section and towards said outer casing and layer of insulation material, longitudinally between said end section and said fluid seal means and past said seal means, said passage thereafter extending through said joint assembly to the free ambient surroundings of said joint assembly, said passage at all points along its path being out of direct contact with said insulation layer so as to prevent fluid in said passage from reaching said insulation layer but at the same time providing a path to said ambient surroundings for fluid under pressure within said passage said joint assembly further including a circumferential end seal located concentrically around and against a second portion of said core end section between said adjacent end and said coupling arrangement and wherein at least a portion of said passage is provided by said end seal and said coupling arrangement.

12. A conduit arrangement according to claim 11, said conduit arrangement defining a second passage extending from said insulation layer to said ambient surroundings, said second passage providing a path to ambient surrounding for fluid under pressure within said insulation layer.

13. A conduit arrangement according to claim 12 including means to prevent fluid which is under substantially no pressure from passing through said second passage in the direction towards said insulation layer.

* * * * *